2,968,488
TOOL-DRIVING SHAFT ASSEMBLY FOR HOUSEHOLD APPLIANCES

Manfred Kübel, Ottersweier, Baden, and Harry Preiss, Buhl, Baden, Germany, assignors, by mesne assignments, to Robert Bosch G.m.b.H., Stuttgart, Germany, a German corporation Filed Apr. 20, 1959, Ser. No. 807,547

2 Claims. (Cl. 279—24)

Our invention relates to household appliances with a rotating tool whose shaft is removably stuck into a bearing sleeve of the drive. Such removable tool shafts are used for example in electric mixers in which the mixing or beating tools, including their shafts, can be inserted into the driving sleeves simply by forcing the shafts into a spring-biased seat from which they can be removed by applying sufficient pulling force to the shaft.

In the known appliances of this kind, the shaft of the exchangeable tool is held in the receiving sleeve of the drive by means of an expansion ring which prevents undesired axial displacement of the tool shaft. However, the latching action thus obtainable leaves much to be desired because it is not reliable over prolonged periods of use due to the fact that the material of the expansion ring, at the necessarily small dimensions, is subjected to extremely great stress.

It is an object of our invention to eliminate such shortcomings.

To this end, and in accordance with a feature of our invention we provide the tool shaft in a household or kitchen appliance of the above-mentioned kind with an annular groove at one extreme end of the shaft which, when the shaft is assembled with the driving sleeve, protrudes axially out of that sleeve. The groove is engaged by elastic retainer means of elongated shape whose ends are seated on the driving portion of the assembly so as to extend substantially in a direction tangential to the tool shaft, the middle portion of the retainer means being bendingly deflectable to catch into the annular groove. This permits mounting the elastic retaining means above, or axially beside, the shaft-receiving sleeve of the drive where sufficient space is readily available to provide elastice means of the sufficient size to prevent overstressing. Furthermore, the annular groove at this location can be given a particularly large depth without weakening the tool shaft at any location where driving power is transmitted from the sleeve to the tool and hence where the shaft may be subjected to breaking forces.

According to another feature of our invention the above-described retainer means consist of two helical springs which extend parallel to each other on diametrically opposite sides of the tool shaft.

Figure 1:
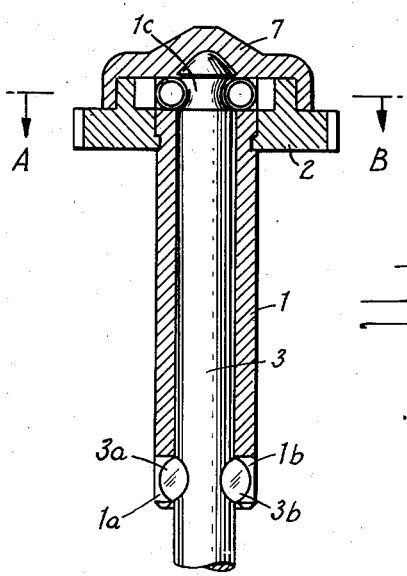
Figure 2:
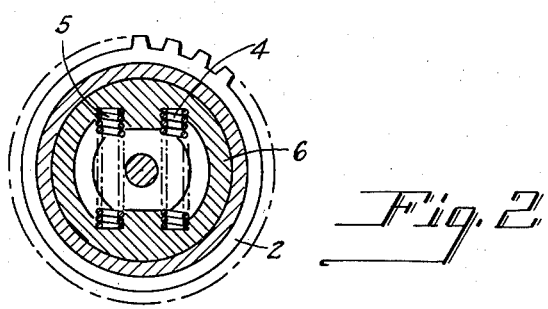

The invention will be further explained with reference to the accompanying drawing in which an embodiment of a plug-in shaft assembly according to the invention is illustrated by way of example. Fig. 1 is an axial section of the device; and Fig. 2 is a radial cross section of the same device taken along line A—B in Fig. 1.

As illustrated, the driving sleeve 1 of the assembly carries a rigidly mounted spur gear 2 by means of which the sleeve, when in operation, is driven to rotate about its axis. The sleeve 1 serves to receive a shaft 3 which carries a tool such as a beater (not illustrated) at its lower end. The shaft 3 is provided with two pinched-out noses 3a and 3b. In the assembled condition, the noses engage respective recesses 1a and 1b of the sleeve for preventing the shaft 3 from rotating relative to the driving sleeve 1.

The upper end of shaft 3 protrudes out of sleeve 2 into a space beneath a cap 7 firmly joined with the spur gear 2. An annular groove 1c of relatively large size and large depth in comparison with the shaft diameter is provided at the upper, protruding end of the shaft. In the assembled condition, two helical springs 4 and 5 engage the annular groove at diametrically opposite sides. The two helical springs are seated in recesses of a bearing portion 6 integral with the cover 7. The springs thus retain the shaft in assembled condition so that the shaft can be removed from the driving sleeve 1 only by applying a forceful pull in the longitudinal direction with the effect that the helical springs 4 and 5 will yield laterally.

The improvement afforded by the invention over the known tool-shaft assemblies with a ring-shaped washer spring holding the tool shaft in the driving sleeve is further illustrated by the following comparison.

In the known devices with a ring-shaped expansion spring, the stress imposed upon the spring ring is extremely great because of the small diameter of the tool shaft used in household mixers or beaters. The spring therefore is apt to be overloaded and to be damaged by permanent deformation. To make such a spring secure an adequate latching pressure, very narrow tolerances must be observed as regards the diameter of the spring and the dimensions of the annular groove of the shaft. It has been found in practice that the arresting spring force may vary between extreme limits, such as between insufficient arresting action and undesired freezing of the spring in the groove, the latter fault being apt to occur if the median diameter of the annular groove is but 0.1 to 0.2 mm. too small. In contrast thereto, the helical springs in a device according to the invention operate satisfactorily with wide tolerance limits as regards the dimensions of the annular groove or the springs. Since the springs are stressed laterally, virtually all turns of the helix participate in furnishing the latching force. For example, with a tool-shaft diameter of 6 mm., the spring wire of which the two helical springs are made can be given a total length of 344 mm., whereas the corresponding length of a ring spring of conventional type is only about 14 mm. for the same shaft diameter.

Plug-type shaft assemblies according to the invention are of particular advantage for kitchen appliances in which the driving assembly is accommodated within a handy and easily manipulatable structure so that the tools, freely protruding from the driving structure, can be conveniently placed into the medium, such a dough or egg white, to be mixed or beaten in a dish. Mixing appliances of this type are preferably provided with two opposingly rotating tools whose respective shafts extend parallel to each other. However, the invention may also be used to advantage for appliances of different design or purpose.

We claim:

1. A tool-driving shaft assembly for household appliances, comprising a driving member having a bearing sleeve, a tool shaft coaxially seated in said sleeve and slidable longitudinally in said sleeve for assembling and disassembling purposes, said sleeve and said shaft having respective clutch elements integral with said sleeve and shaft and engageable with each other by longitudinal sliding motion of said shaft into assembled engagement with said sleeve, said shaft when assembled having an extreme end protruding out of said sleeve and in axial abutment with said driving member, said shaft having at said end an annular coaxial groove, and an elongated elastic retainer extending substantially in a direction tangential to said shaft and being longer in said direction than the outer diameter of said sleeve, said retainer having its two ends seated on said driving member and having a bendingly deflectable middle portion in engagement with said groove to removably secure said shaft in said sleeve.

2. A tool-driving shaft assembly for household appliances, comprising a bearing sleeve, a drive member rigidly formed with said sleeve in coaxial relation thereto and having a larger diameter than said sleeve, a tool shaft coaxially seated in said sleeve and slidable longitudinally in said sleeve for assembling and disassembling purposes, said sleeve and said shaft having respective clutch elements integral with said sleeve and shaft and engageable with each other by longitudinal sliding motion of said shaft into assembled engagement with said sleeve, said shaft when assembled having an extreme end protruding out of said sleeve and having at said end an annular coaxial groove, and two helical springs extending parallel to each other in a direction perpendicular to the longitudinal axis of said tool shaft, said two springs being longer in said direction than the diameter of said sleeve, each of said springs having its two ends in pressure-engagement with said driving member, and said two springs being engageable from opposite sides respectively with said annular groove of said shaft to removably secure said shaft in said sleeve.

References Cited in the file of this patent

UNITED STATES PATENTS

| | | |
|---|---|---|
| 994,804 | Wahlstrom | June 13, 1911 |
| 1,131,863 | Phillips | Mar. 16, 1915 |
| 1,314,044 | Buker | Aug. 26, 1919 |
| 2,593,794 | Resina | Apr. 22, 1952 |